/ United States Patent /
Merat et al.

(10) Patent No.: US 11,428,582 B2
(45) Date of Patent: Aug. 30, 2022

(54) OVERHEAT DETECTION SYSTEM (71) Applicants: Airbus Operations SAS, Toulouse (FR); Airbus Operations S.L., Getafe (ES)

(72) Inventors: Romain Merat, Toulouse (FR); Marta Castillo De Alvear, Getafe (ES); Sijmen Zandstra, Toulouse (FR); Javier Fraile Martin, Getafe (ES); Carlos Bueno Vazquez, Getafe (ES); Jose Perez Garcia, Getafe (ES)

(73) Assignees: AIRBUS OPERATIONS SAS, Toulouse (FR); AIRBUS OPERATIONS S.L., Getafe (ES)

( * ) Notice: Subject to any disclaimer, the term of this patent is extended or adjusted under 35 U.S.C. 154(b) by 799 days.

(21) Appl. No.: 16/391,825

(22) Filed: Apr. 23, 2019

(65) Prior Publication Data
US 2019/0323899 A1 Oct. 24, 2019

(30) Foreign Application Priority Data

Apr. 24, 2018 (EP) .................................. 18382274

(51) Int. Cl.
*H02H 5/00* (2006.01)
*G01K 3/00* (2006.01)
*G01K 1/024* (2021.01)
*A62C 37/48* (2006.01)
*B64D 45/00* (2006.01)

(52) U.S. Cl.
CPC ............. *G01K 3/005* (2013.01); *G01K 1/024* (2013.01); *A62C 37/48* (2013.01); *B64D 2045/0085* (2013.01)

(58) Field of Classification Search
None
See application file for complete search history.

(56) References Cited

U.S. PATENT DOCUMENTS

| 5,294,909 | A | | 3/1994 | Frazier | |
|---|---|---|---|---|---|
| 6,127,741 | A | * | 10/2000 | Matsuda | H02J 9/02 307/10.6 |
| 6,326,598 | B1 | * | 12/2001 | Carvalho | H02H 3/042 219/505 |
| 10,282,957 | B1 | * | 5/2019 | Kirkbride | G01J 5/0066 |
| 2020/0191680 | A1 | * | 6/2020 | Cipullo | G01K 11/32 |
| 2020/0370967 | A1 | * | 11/2020 | DeWitt | G01K 11/3206 |
| 2021/0024200 | A1 | * | 1/2021 | Rogers | G01M 11/3145 |

OTHER PUBLICATIONS

European Search Report; priority document.

* cited by examiner

*Primary Examiner* — Stephen W Jackson
(74) *Attorney, Agent, or Firm* — Greer, Burns & Crain, Ltd.

(57) ABSTRACT

An overheat detection system comprising a controller for declaring the overheat, and two wiring connections running along a monitored system and configured to react upon overheat. The controller is configured to determine an electrical status of each wiring connection at least between operative and inoperative, the inoperative status corresponding to an electrical anomaly thereof, and electrically connect or disconnect the wiring connections depending on the electrical status thereof, wherein the declaration of overheat is based on a dynamic reconfiguration of the overheat detection system.

18 Claims, 5 Drawing Sheets

OVERHEAT DETECTION SYSTEM

CROSS-REFERENCES TO RELATED APPLICATIONS

This application claims the benefit of the European patent application No. 18382274.1 filed on Apr. 24, 2018, the entire disclosures of which are incorporated herein by way of reference.

FIELD OF THE INVENTION

The present invention belongs to the field of pneumatic air distribution systems, and particularly, it belongs to the field of overheat detection systems for declaring ambient overheats in the vicinity of pneumatic air distribution systems.

In particular, such overheat declaration, performed by the overheat detection system of the invention, takes into account the electrical healthy of its components in situ, in order to characterize its capacity to serve the intended purpose.

BACKGROUND OF THE INVENTION

Overheat detection systems (OHDS) are part of the basic architecture of an aircraft and are commonly used in the vicinity of the pneumatic air distribution systems in order to detect air leakage events, so-called 'overheat'. When one of these events take place, air at high pressure and high temperature taken, for example, from the engines of the aircraft, leaks from the ducts meant to convey this air. These leakage events present a risk for the correct performance of the in-flight operations and so, they must be rapidly and effectively detected.

As it is well known in the state of the art, classic architecture of overheat detection systems (OHDS) comprise a plurality of wired sensing connections configured to react upon overheat, these connections being connected to a controller forming independent closed loops. The structure of these wired sensing connections normally consists of an outer sheath containing a eutectic salt surrounding a central wire.

Sometimes, this loop can be single or double, in order to improve robustness and reliability against potential integrity failures, which can result in a number of electrical loop statuses. Some of these electrical statuses could prevent a single loop from detecting overheat events properly.

The change in these electrical statuses can be the result of the performance conditions to which loops are exposed (e.g., vibration during operation). These different electrical statuses are the following:

Normal: in a normal status, there are no anomalies. Therefore, an overheat would result in melting the eutectic salt, turning it into a liquid compound that would create an electrical path between the center wire and the outer sheath, thus reducing the impedance of the wiring connection as a whole.

Short: due to vibration, the central wire could establish direct contact with the outer sheath, thus provoking a rapid decrease of the impedance of the wiring connection, rapidly enough not to be considered as an overheat in a normal electrical status scenario.

Open: in an "open" status, the wiring connection comprises an electrical anomaly. Normally, the central wire impedance is higher than a predetermined threshold. This can be due to, for example, a discontinuity.

This particular electrical status presents some drawbacks. In a double loop configuration, in case a detection loop becomes open just in one location along the circuit, electrical continuity would be ensured as both sides of that wiring connection would still be connected to the controller, thus allowing overheat detection.

However, in case of multiple electrical anomaly (i.e., opens) locations on the same loop, the section between the open circuits would no longer be able to detect overheat independently of whether it is a single or double loop configuration.

It is well known in the current practice that the simplest architectures perform a single check during power-up operations to check any integrity problem such as an open loop. However, if a loop suffered from any failure in-flight, it would not be detected. Thus, the system could not react and reconfigure properly. Therefore, if one of the loops became open in more than one location, the detection capability would be lost on the section between two consecutive open locations without any alert to the crew (see, for example, the scheme of FIG. 3d).

To overcome this problem, the most advanced systems implement continuous checks to determine the electrical loop integrity. In case a loop is considered to be an open circuit, an alert is triggered and the detection system will no longer take into account the affected loop signals, relying fully on the remaining healthy loop. However, in case of an open circuit on both loops, the overheat detection capability would be lost. It is to be noted that, as long as the open remains, an open alert is repeatedly sent.

Furthermore, in these advanced systems many false open alerts will be triggered due to, for example, temporary opens caused by vibrations. These temporary electrical anomalies such as 'opens' are emphasized in aeronautics since aircraft are highly subjected to vibration induced either from air turbulence or the engine rotation per se.

As a result, the alerting logic should be separated from the reconfiguration logic to ensure reliability on the overheat declarations. Furthermore, in view of the potential effects of these electrical statuses of the wired sensing connections, and the solutions found in the state of the art, it is necessary to provide overheat detection systems with dynamic electrical integrity check capabilities as well as with dynamic reconfiguration capabilities in order to provide the system with increased availability.

SUMMARY OF THE INVENTION

The present invention provides a solution for the aforementioned problems, by an overheat detection system, a pneumatic air distribution system, and a method for declaring an overheat.

In a first inventive aspect, the invention provides an overheat detection system comprising:

a controller configured to declare the overheat, and two wiring connections running the same path along a monitored system, each wiring connection connected in an independent loop with the controller, wherein each wiring connection is configured to react upon overheat on the monitored system, and the controller is configured to:

determine an electrical status of each wiring connection at least between operative and inoperative, the inoperative status corresponding to an electrical anomaly thereof, electrically connect or disconnect the wiring connections depending on the electrical status thereof, so that:

in case the controller determines that both wiring connections are in operative status, both wiring connections are maintained connected;

in case the controller determines that only one wiring connection is in inoperative status, the inoperative status wiring connection is disconnected;

in case the controller determines that both wiring connections are in inoperative status, both wiring connections are maintained connected;

declare an overheat in one of the following cases:

when the controller determines that both wiring connections are in operative status and both wiring connections react upon such overheat, when the controller determines that only one wiring connection is in inoperative status and the only one operative wiring connection reacts upon such overheat, when the controller determines that both wiring connections are in inoperative status, and at least one of such inoperative wiring connections reacts upon such overheat.

As it was briefly discussed, an 'overheat' normally comes from a hot air leakage on the monitored system, wherein such hot air was originally housed or channeled therein.

Throughout this entire document, 'wiring connection' will be understood as an electrical connection intended to close an independent loop within a controller. In particular, the wiring connection according to the invention is configured to change its inherent properties in response to an overheat; that is, the wiring connection is configured to react upon such overheat. Thus, 'wiring connection' may be equivalent to 'wired sensing connection' due to its capacity to react upon overheat.

A particular way that the electrical wiring reacts upon such overheat is by modifying the electrical continuity provided, being caused by the change in its inherent properties.

Thus, based on the change in the inherent properties of the wiring connection under the action of overheat, the controller is configured to discern whether an electrical signal ('input') received in that independent loop is related to a detection of overheat in such wiring connection. Preferably, the controller is configured to detect any modification of the electrical continuity of a wiring connection caused by overheat.

Further, the controller is configured to determine the electrical status of each wiring connection. If an electrical anomaly exists at any point along a particular wiring connection, the controller determines that the electrical status of such wiring connection is inoperative. An electrical anomaly shall be understood as any deviation from the expected electrical behavior of the wiring connection.

It is to be noted that, in the absence of such electrical anomaly, the controller determines that the electrical status of such wiring connection is operative.

Hence, the wiring connection is to be understood as a passive element subject to modification under the operational conditions, while the controller is responsible for conferring the proper electrical status by its determination act.

Moreover, it is to be noted that the two wiring connections are to be installed on the monitored system in such a way that they are adapted to monitor it. That monitoring is based on a reaction upon overheat taking place at any point along the path.

Besides, the controller allows reconfiguration of the detection system in order to electrically connect/disconnect particular wiring connections. A person skilled in the art might recognize that a proper physical disconnection would not be necessary, but only disregarding the electrical signal received from that particular wiring connection defined as disconnected.

It is to be noted that no alert of inoperative electrical status is sent during the operation of the overheat detection system. Instead, an alert about the existence of an inoperative wiring connection may be sent only afterwards.

Advantageously, the present system increases its operational availability in comparison with the proposed solutions of the state of the art.

In this sense, even if both wiring connections are in inoperative status (thus lacking its detection capacity in the prior art solutions), the present invention provides a solution to rely on at least one overheat detection—by only one wiring connection reacting upon it—to declare the same. Thus, the probability that a wiring connection with multiple electrical anomalies at different points (being inoperative) disables the overheat detection capability is drastically reduced.

In this later scenario of overheat declaration, making a simile with logic gates, the overheat declaration criteria shall revert to an "OR" gate, in which a reaction from either wiring connection can raise an overheat declaration.

In a preferred embodiment, each wiring connection is configured to react upon overheat on the monitored system based on their respective impedances, preferably the overheat producing a predetermined decrease of the impedance of each wiring connection.

In a particular embodiment, the controller is configured to check the electrical status of each wiring connection once each second.

Advantageously, a continuous monitoring of the electrical integrity capability of the system is provided. Thus, dynamic reconfiguration is allowed based on in situ electrical conditions of the overheat detection system components.

In other words, the operation safety is increased through continuous monitoring both by ensuring that the system is reconfigured appropriately and also by ensuring that once the electrical anomaly disappears, the full functionality of that independent loop is recovered.

It is to be noted that, the checking process carried out by the controller shall conclude (if no other condition exists) with a determination of the electrical status of each wiring connection.

In a particular embodiment, the controller determines that the wiring connection is in inoperative status only if the corresponding electrical anomaly lasts at least a first predetermined time threshold, preferably consisting of a few seconds.

In this particular embodiment, an electrical anomaly within a particular wiring connection must remain at least the predetermined time threshold in order to be determined as inoperative by the controller.

Advantageously, the present system prevents from the alerting of spurious inoperative status. Therefore, the robustness of the system is increased.

Special attention is to be drawn to monitored systems affected by either long or short-time vibrations, which may induce modifications in the electrical continuity of the wiring connections.

In a particular embodiment, the electrical status of each wiring connection is checked upon controller power-up in order to determine a baseline electrical status of each wiring connection as either operative or inoperative.

It is to be noted that, in this scenario, the possible temporary electrical anomalies to be present are highly reduced, as these anomalies are more favorable to come up as thermal, vibrations and electrical environmental conditions are benign and fully stabilized at this time.

In a particular embodiment, the controller determines the electrical status of each wiring connection as a baseline only if this status lasts at least a second predetermined time threshold.

That is, preferably there is a confirmation time of some seconds to determine the electrical status of each wiring connection as a baseline.

In a preferred embodiment, the second predetermined time threshold is higher than the first predetermined time threshold. More preferably, the second predetermined time threshold is about three to four times the first predetermined time threshold.

In a particular embodiment, in case the controller determines that both wiring connections are in inoperative status as the baseline electrical status, the controller electrically disconnects both wiring connections, an overheat not being declared.

In this particular scenario, the overheat detection system is ceased.

In a particular embodiment, the electrical status of each wiring connection is checked before shutting down the controller in order to determine an ending electrical status of each wiring connection as either operative or inoperative.

Preferably, this last check is run shortly before the shutting down of the controller, and therefore it is likely that the monitored system is also shut down. Thus, neither vibration nor other causes of temporary electrical malfunctions are expected to happen, the ending electrical status being more reliable.

Hence, the existence of a permanent inoperative wiring connection is confirmed on-ground, in case the overheat detection system is mounted on an aircraft.

In a particular embodiment, the controller is configured to report to a database the ending electrical status of each wiring connection determined before shutting down the controller.

In case the overheat detection system is mounted on an aircraft, the database is preferably a 'post-flight report', thus recording reliable electrical health (or integrity) of the system in order to take appropriate maintenance tasks.

In a particular embodiment, the monitored system on which the wiring connections are running along is part of a pneumatic air distribution system.

In a preferred embodiment, the pneumatic air distribution system is mounted on an aircraft.

Therefore, the controller of the overheat detection system is the so-called Bleed Monitoring Computer or 'BMC'.

In a particular embodiment, each wiring connection comprises at least one sensing means connected in the same independent loop with the controller, the sensing means comprising a conductor core, a conductor outer sheath, and eutectic salts therebetween.

These sensing means connected within the wiring connection allow increased accuracy of overheat detection as the sensing means are more sensitive, thus providing a more distinguishable reaction upon it.

In addition, as a set of sensing means are connected within series along the monitored system, the reaction of a particular sensing means allows the allocation of the particular point at which the overheat has taken place.

In a particular embodiment, an inoperative status of the wiring connection is determined by the controller if the conductor core of at least one of its sensing means comprises at least one electrical anomaly, such as a discontinuity.

In a particular embodiment, the sensing means comprises default impedance which reacts upon overheat by decreasing. As a result, an electrical path is created between the conductor core and the conductor outer sheath of the sensing means.

In other words, overheat on the monitored system produces a predetermined decrease on the sensing means impedance, thus creating an electrical path between the conductor core and the conductor outer sheath.

In a second inventive aspect, the invention provides a pneumatic air distribution system comprising an overheat detection system according to any of the embodiments according to the first inventive aspect.

This is, the pneumatic air distribution system (in full or in part) is the system intended to be monitored in the first inventive aspect.

In a third inventive aspect, the invention provides an aircraft comprising an overheat detection system according to any of the embodiments of the first inventive aspect.

In a fourth inventive aspect, the invention provides a method for declaring an overheat, wherein the method comprises:

providing an overheat detection system according to any of the embodiments of the first inventive aspect, and determining by the controller the electrical status of each wiring connection at least among operative and inoperative, such that:

in case the controller determines that only one wiring connection is in inoperative status, the controller electrically disconnects such inoperative wiring connection, or in case the controller determines that both wiring connections are in the same electrical status, both wiring connections remains connected, wherein the method further comprises declaring an overheat in one of the following cases:

when both wiring connections are in operative status, and both wiring connections react upon such overheat;

when only one wiring connection is in inoperative status, and the only one operative wiring connection reacts upon such overheat; or when both wiring connections are in inoperative status, and at least one of such inoperative wiring connections reacts upon such overheat.

In a fifth inventive aspect, the invention provides a data processing apparatus comprising means for carrying out the method according to any of the embodiments of the fourth inventive aspect.

In a sixth inventive aspect, the invention provides a computer program comprising instructions which, when the program is executed by a computer, cause the computer to carry out the method according to any of the embodiments of the fourth inventive aspect.

In a seventh inventive aspect, the invention provides a method for establishing a detection logic of an overheat detection system according to any of the embodiments of the first inventive aspect, wherein the controller of the overheat detection system is configured to switch the detection logic as follows:

in case the controller determines that both wiring connections are in operative status, the controller switches the detection logic to 'conjunction' ('AND'), an overheat being declared only if both wiring connections react upon such overheat;

in case the controller determines that only one wiring connection is in inoperative status, the controller electrically disconnects such wiring connection, an overheat being declared only if the operative wiring connection reacts upon such overheat;

in case the controller determines that both wiring connections are in inoperative status, the controller switches the detection logic to 'disjunction' ('OR'), an overheat being declared only if at least one wiring connection react upon such overheat.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

As it will be appreciated by one skilled in the art, aspects of the present invention may be embodied as a system, method, data processing apparatus, or a computer program.

Figure 1:
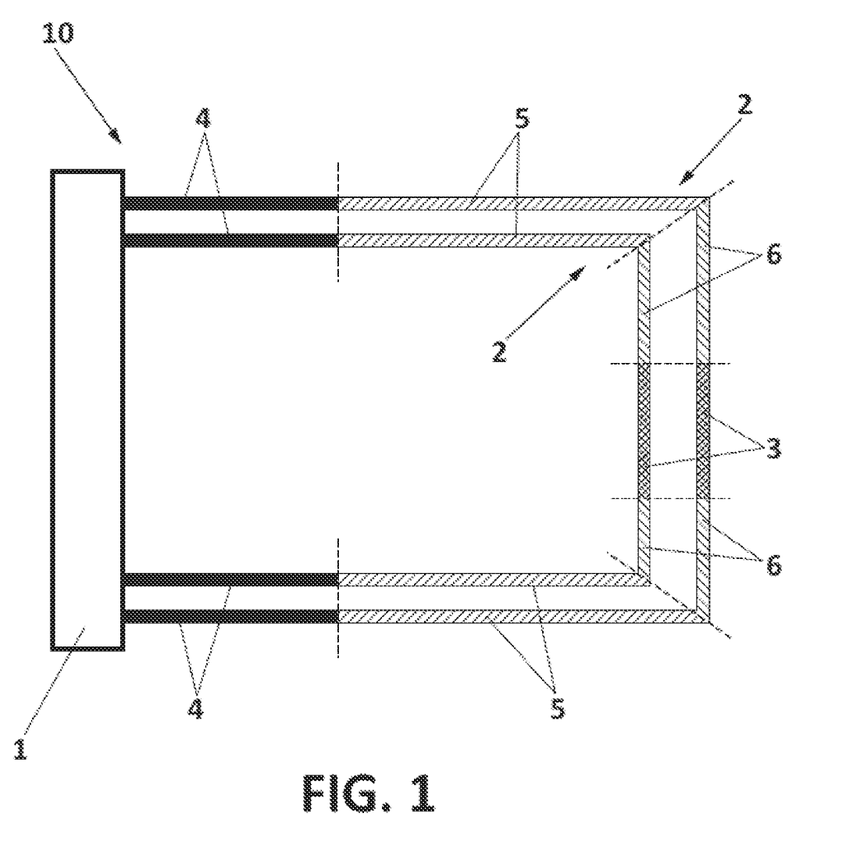
FIG. 1 shows a schematic lay-out of an embodiment of the overheat detection system according to the invention.

FIG. 1 depicts a schematic embodiment of an overheat detection system (10). As it can be seen, the overheat detection system (10) comprises:
 a controller (1), and
 two wiring connections (2) running along the same path, and each one being connected in an independent loop with the controller (1). As two wiring connections (2) are considered, this architecture is also known as a 'double loop'.

The controller (1) is an electronic device electrically connected with both wiring connections (2) in independent loops. In particular, the controller (1) is the so-called Bleed Monitoring Computer ('BMC'). The main functions of the controller (1) are as follows:
 determining the electrical status of each wiring connection (2) at least among operative and inoperative,
 electrically connecting/disconnecting the wiring connections (2) depending on their respective electrical status, and
 declaring an overheat under some circumstances.

In addition, the two wiring connections (2) run along the same path of a monitored system (10). In particular, the monitored system (10) on which the wiring connections (2) are running along is part of a pneumatic air distribution system (10) of an aircraft. Preferably, these wiring connections (2) cover the areas where overheat detection function is required.

Additionally, as it can be observed in FIG. 1, each wiring connection (2) is sectioned in:
 a pair of aircraft harness (4),
 a pair of connecting cables (5), and
 at least one sensing means. In case more than one sensing element is envisaged, the wiring connection (2) further comprises interconnecting cables (6) coupling a pair of sensing elements therebetween.

Thus, the pair of aircraft harnesses (4) and connecting cables (5) allows extending the system (10) and thus reaching remote areas intended to be monitored.

Figure 3A:
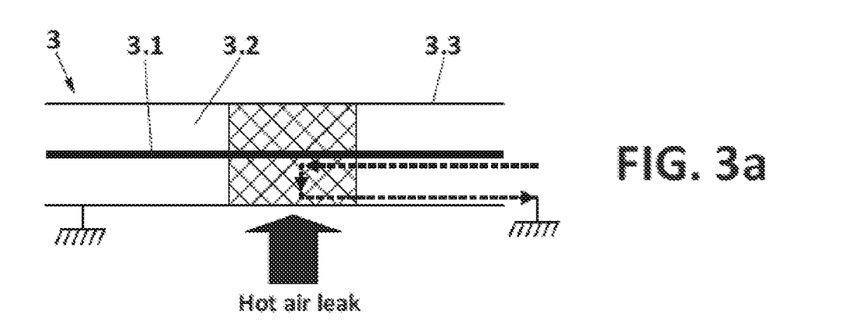
FIG. 3a schematically shows the way that a wiring connection reacts upon overheat.

Preferably, this wiring connection (2) allows overheat detection based on the impedance measurement carried out by the controller (1). This condition will be discussed in more detail addressing FIG. 3.

Figure 2:
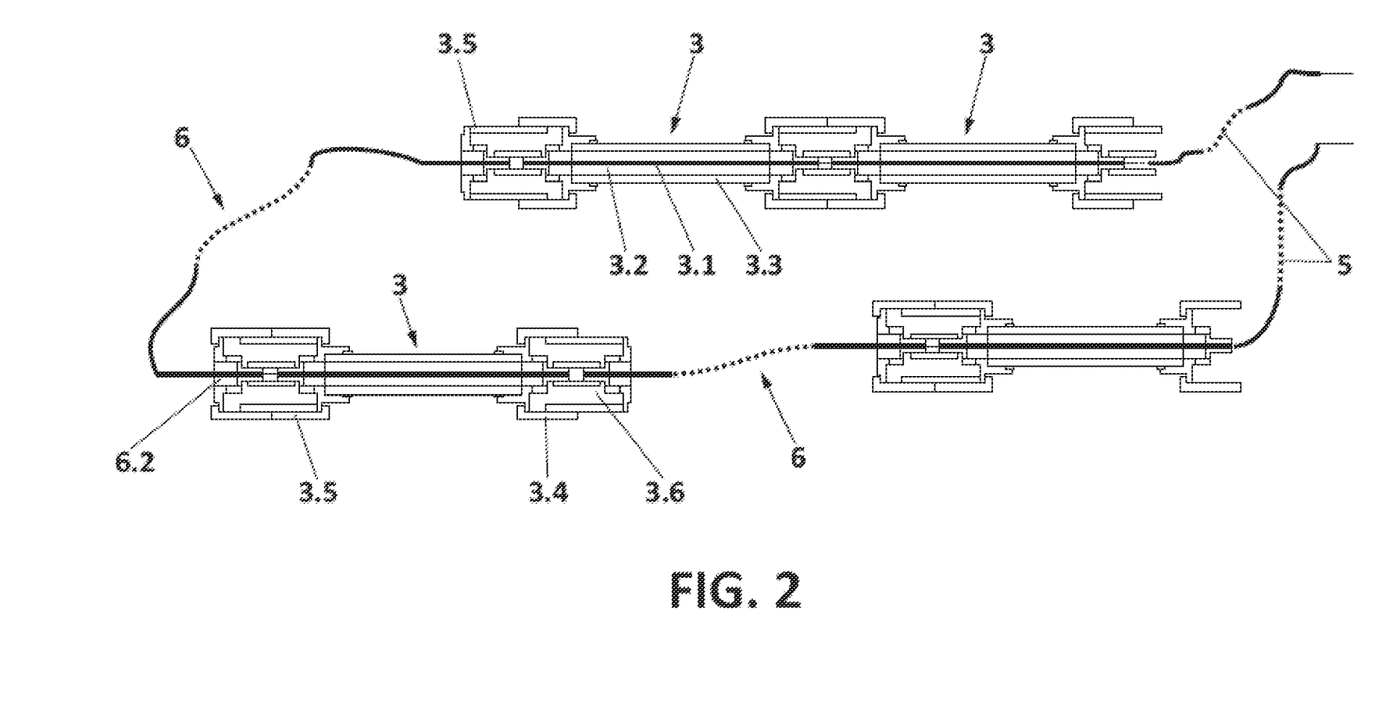
FIG. 2 shows a particular embodiment of a wiring connection comprising various sensing means connected therein.

FIG. 2 depicts a particular embodiment of a wiring connection (2) comprising various sensing means connected therein. As it can be observed, the wiring connection (2) comprises one interconnecting cable (6) for each pair of sensing means, thus mechanically and electrically coupling them. That mechanical and electrical coupling is provided by means of connectors (6.1, 6.2) at the ends of the interconnecting cable (6). Additionally, the connectors are of the type of male (6.2)-female (6.1) connectors allowing secure coupling. Similarly, the sensing means (3) further comprises connectors of the type of male (3.4)-female (3.5) connectors.

These sensing means are connected in series along an acknowledged path of the system (10) to be monitored. Thus, the length and number of both sensing means and interconnecting cables (6) are planned beforehand to better suit the conflict areas on the monitored system (10); those conflict areas having a high risk of undergoing an overheat.

Each sensing means shown in FIG. 2 comprises a conductor core (3.1), a conductor outer sheath (3.3), and eutectic salts (3.2) therebetween. In this sense, although the three components decrease their impedance under the rising of temperature, due to its inherent properties, the eutectic salt (3.2) significantly decreases its impedance when the temperature rises above the triggering point.

It is to be noted that such wiring connection (2) is connected within electronic controller (1) forming an independent loop (the controller is not shown in FIG. 2). In a particular embodiment, such controller (1) is configured to measure the electrical continuity of the wiring connection (2) in order to detect any impedance change caused by overheat.

In the absence of air leakage (that is, in the absence of overheat) the impedance of the wiring connection (2) is higher than upon an overheat taking place.

In particular, even though the impedance of metallic components of the sensing means is small, the impedance of cold eutectic salt (3.2) is high. In the event of overheat, since a section of a particular sensing means is heated, the impedance of its eutectic salt (3.2) within this section is highly reduced, and then puts low impedance between the internal metallic core and the external metallic surface. As a result, this impedance decreasing is measured and detected by the electronic component connected to the wiring connection (2).

FIG. 3a schematically depicts a particular way that a wiring connection (2) reacts upon overheat. In this figure, the wiring connection (2) comprises a sensing means in turn comprising a conductor core (3.1), a conductor outer sheath (3.3), and eutectic salts (3.2) therebetween.

As it was mentioned, an 'overheat' event is caused by hot air leakage escaping from a monitored system (10) which impacts on the wiring connection (2). In this scenario, the eutectic salt (3.2) becomes liquid thus creating an electrical path between the conductor core (3.1) and the conductor outer sheath (3.3) of the sensing means. This is mainly caused by a rapid impedance decrease. At the end, the impedance of the wiring connection (2) as a whole is reduced.

A skilled person in the relevant art would recognize that, in the absence of sensing means, a section of the wiring connection impacted by hot air leakage—overheat—will undergoes an appreciable decreasing of impedance, thus allowing the controller (1) to detect it.

For illustrative reasons, the electrical path followed during an overheat is reproduced by arrows in dashed lines.

Figure 3B:
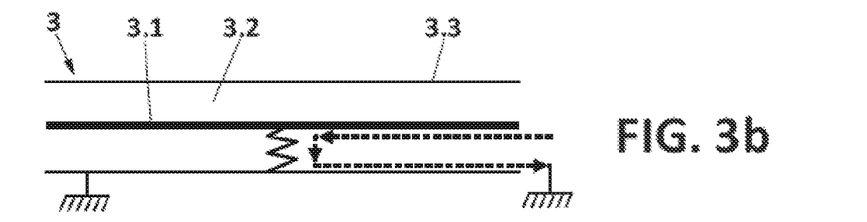
FIGS. 3b-3d show different examples of inoperative electrical statuses of the wiring connection.
Figure 3C:
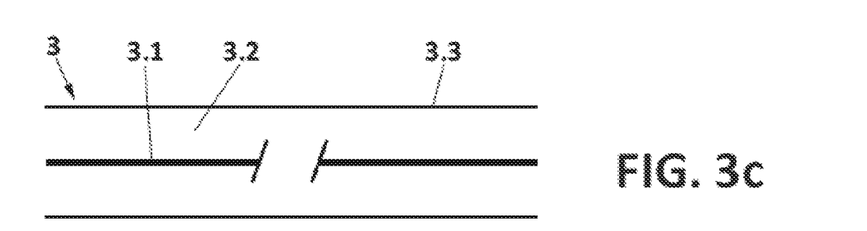
Figure 3D:
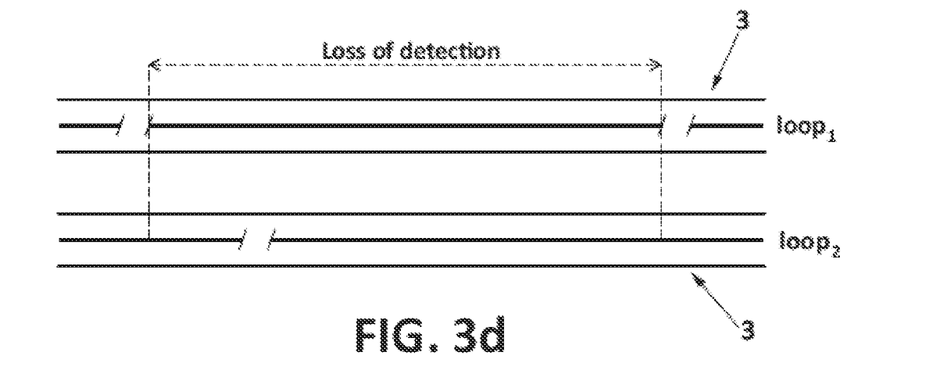

FIGS. 3b to 3d depict examples of inoperative electrical statuses of the wiring connection (2), in relation with the respective electrical anomaly that provokes it.

FIG. 3b depicts a 'short electrical status'. Due to vibration or inherent failure, the central wire could establish direct contact with the outer sheath (3.3).

FIG. 3c depicts a single discontinuity, as a 'single open electrical status'. In this scenario, the central wire impedance is normally higher than a predetermined threshold.

In this case, with the present invention, the overheat detection capacity of that wiring connection (2) is not affected insofar the overheat creates the new electrical path. Preferably, an electrical path is created between the conductor core (3.1) and the conductor outer sheath (3.3) of a sensing means, thus allowing the return of the electrical signal to the controller (1) and closing the loop.

Therefore, even with the existence of a single open, electrical continuity, overheat detection would be ensured as both sides of the electrical wiring are still connected to the controller (1), thus restoring overheat detection capacity.

It is to be noted that, for exemplary reasons, only one wiring connection (2) is shown in FIGS. 3a to 3c. Nevertheless, the system (10) according to the invention envisages two wiring connections (2).

FIG. 3d depicts a multiple electrical discontinuity, as a 'multiple open electrical status' in a dual loop architecture (i.e. 'loop1' and 'loop2'). In this scenario, multiple electrical anomalies (i.e., opens) have taken placed at different locations along a particular wiring connection (2) (in this particular case, in 'loop1'). Therefore, the section between the electrical anomalies (named in FIG. 3d as 'loss of detection') would no longer be able to inform the controller about its reaction upon overheat.

As it was briefly discussed in the background of the invention, it is required in conventional solutions that if overheat occurs, both loops have to detect the same in order to be declared by the controller (1). In this situation, since there is a section of the affected loop isolated, this intermediate section between 'opens' would no longer inform and therefore the condition that both loops detect it cannot be fulfilled in case such overheat occurs within that intermediate section.

Nevertheless, the present invention solves the above drawback as dynamic reconfiguration for declaring an overheat takes place. With the system (10) according to the invention, even if there are multiple electrical anomalies in a particular wiring connection (2) (i.e. in 'loop1'), one of the following cases happens:

when the controller (1) determines that only such wiring connection (2) is in inoperative status (with multiple opens, 'loop1'), the inoperative wiring connection (2) is disconnected, and the overheat is declared when only the operative wiring connection (2) reacts upon such overheat, or, when the controller (1) determines that both wiring connections (2) are in inoperative status (at least one with multiple opens), both wiring connections (2) are maintained connected, and the overheat is declared when at least one of such inoperative wiring connections (2) reacts upon such overheat.

Therefore, the availability of the overheat declaration capacity is increased by the overheat detection system (10) according to the invention, in comparison with conventional solutions.

Figure 4:
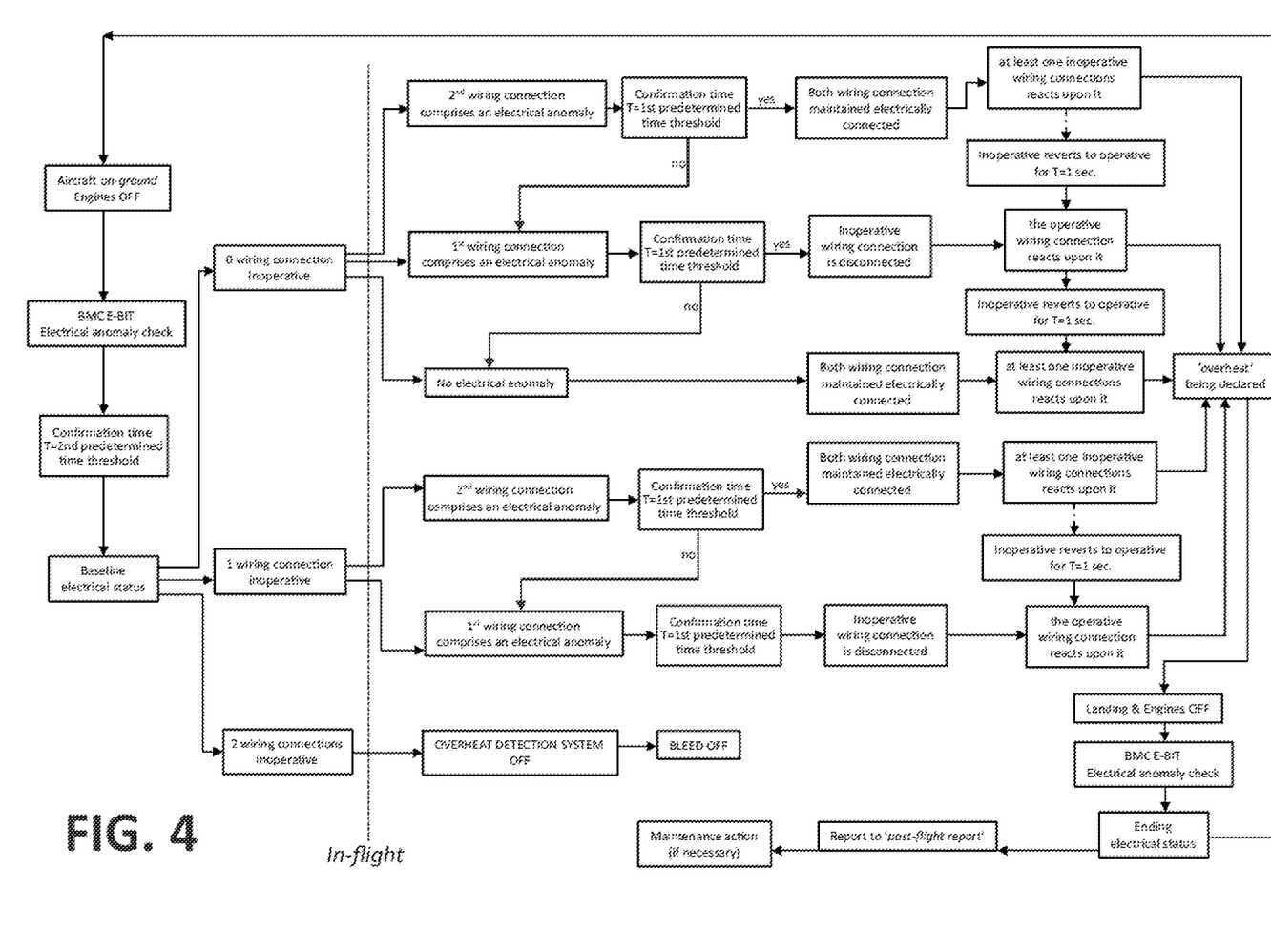
FIG. 4 shows a flowchart describing an embodiment of a method for declaring overheat according to the invention.

FIG. 4 depicts the steps of an embodiment of the method for declaring overheats by an overheat detection system (10) according to the invention. Briefly, the steps of the method are shown as follows:

providing an overheat detection system (10) which comprises:

a controller (1), and two wiring connections (2) running along the same path, and each one being connected in an independent loop with the controller (1), determining by the controller (1) the electrical status of each wiring connection (2) at least between operative and inoperative, such that:

in case the controller (1) determines that only one wiring connection (2) is in inoperative status, the controller (1) electrically disconnects such inoperative wiring connection (2), or in case the controller (1) determines that both wiring connection (2) are in the same electrical status, both wiring connections (2) remain connected, wherein the method further comprises declaring an overheat in one of the following cases:

when both wiring connections (2) are in operative status, and both wiring connections (2) react upon such overheat;

when only one wiring connection (2) is in inoperative status, and the only one operative wiring connection (2) reacts upon such overheat; or when both wiring connections (2) are in inoperative status, and at least one of such inoperative wiring connections (2) reacts upon such overheat.

As it was already mentioned, the controller (1) is configured to check continuously the electrical status of each wiring connection (2), and therefore the method further comprises the step of:

checking by the controller (1) the electrical status of each wiring connection (2) once each second.

Thus, in case an electrical anomaly in any wiring connections (2) appears (or disappears), the controller (1) will be informed normally in less than 1 second, and thus the criteria to declare an overheat would be updated according to actual electrical integrity. The same operative status is maintained during two electrical integrity checks (1 sec. spaced) in order to revert the inoperative condition into operative.

In the event an electrical anomaly appears, the controller (1) either based on the continuous checking or by isolated information from the impedance modification, shall determine that inoperative electrical condition. Nevertheless, as eventual (or spurious) electrical anomalies may happen, an additional condition that such anomaly remains at least a predetermined time is imposed in order to determine an inoperative status of such wiring connection (2).

As it can be observed, this method is envisaged to be used on aircraft. Therefore, two main situations take place, in-flight and on-ground.

On the in-flight end, the system (10) is self-managed by a dynamic and adaptive reconfiguration to take into account in-situ electrical integrity of the overheat detection system (10).

It is to be noted that during flight, no alert about the advent of an inoperative electrical status is sent or reported. Instead, this alert is sent only afterwards, this is, upon landing, and once the aircraft is on-ground and engines off.

At on-ground end, the electrical status of each wiring connection (2) is checked to provide of initial conditions in order to readjust the overheat declaration criteria. Preferably, the existence of an electrical anomaly is checked upon controller (1) power-up. As a result, a baseline electrical status of each wiring connection (2) is determined.

For assuring an accurate baseline electrical status, the method states a confirmation time in which such electrical anomaly must remain, in order to determine an electrical wiring connection (2) as inoperative. Preferably, this confirmation time takes some seconds.

As it will be observed, the controller (1) of the overheat detection system (10) is the so-called Bleed Monitoring Computer or 'BMC'. Therefore, the initial checking to establish the baseline electrical status is performer under an 'electronic build-in test' ('E-BIT') of the BMC.

According to FIG. 4, in case the controller (1) determines that both wirings connections (2) are in inoperative status as the baseline electrical status, the controller (1) electrically disconnects both wiring connections (2), an overheat not being declared. This is, the overheat detection system (10) is ceased.

Still at on-ground end, the electrical status of each wiring connection (2) is checked before shutting down the controller (1) in order to determine an ending electrical status of each wiring connection (2). Preferably, this is performed upon landing, and once the aircraft engines are shut off. This final check is also performed under an 'electronic build-in test' ('E-BIT') of the BMC.

At this point, the method further comprises sending an alert in case any wiring connection (2) is inoperative in the ending electrical status. As this ending electrical status is less subject to tainting, the method further comprises reporting to a 'post-flight report' such ending electrical status. Preferably, the message introduced is a 'Class II maintenance message'.

Accordingly, the method further comprises carrying out appropriate maintenance tasks to restore the electrical integrity of the wiring connections (2).

Figure 5:
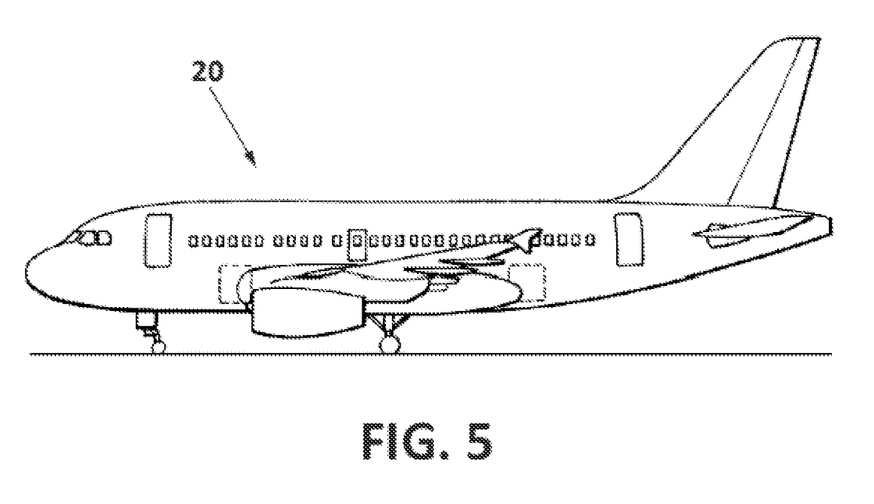
FIG. 5 shows a schematic view of an aircraft comprising an overheat detection system according to the invention.

FIG. 5 shows an example of an aircraft comprising an overheat detection system (10) according to the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An overheat detection system comprising:
a controller configured to declare the overheat, and
two wiring connections running the same path along a monitored system, each wiring connection connected in an independent loop with the controller, wherein
each wiring connection is configured to react upon overheat on the monitored system, and
the controller is configured to:
determine an electrical status of each wiring connection, at least between an operative status and an inoperative status, the inoperative status corresponding to an electrical anomaly thereof,
electrically connect or disconnect the wiring connections depending on the electrical status thereof, so that:
in case the controller determines that both wiring connections are in operative status, both wiring connections are maintained connected,
in case the controller determines that only one wiring connection is in inoperative status, the inoperative status wiring connection is disconnected,
in case the controller determines that both wiring connections are in inoperative status, both wiring connections are maintained connected, declare an overheat in one of the following cases:
when the controller detects that both wiring connections are in operative status and both wiring connections react upon such overheat,
when the controller detects that only one wiring connection is in inoperative status and the only one operative wiring connection reacts upon such overheat,
when the controller detects that both wiring connections are in inoperative status, and at least one of such inoperative wiring connections reacts upon such overheat.

2. The overheat detection system according to claim 1, wherein each wiring connection is configured to react upon an overheat on the monitored system based on their respective impedances.

3. The overheat detection system according to claim 1, wherein, the overheat produces a predetermined decrease of an impedance of each wiring connection.

4. The overheat detection system according to any of claim 1, wherein the controller is configured to check the electrical status of each wiring connection once each second.

5. The overheat detection system according to claim 1, wherein the controller determines that the wiring connection is in inoperative status only if the corresponding electrical anomaly lasts at least a first predetermined time threshold.

6. The overheat detection system according to claim 1, wherein the electrical status of each wiring connection is checked upon controller power-up in order to determine a baseline electrical status of each wiring connection of either operative or inoperative.

7. The overheat detection system according to claim 6, wherein the controller determines the electrical status of each wiring connection as a baseline only if this status lasts at least a second predetermined time threshold.

8. The overheat detection system according to claim 6, wherein in case the controller determines that both wirings connections are in inoperative status as the baseline electrical status, the controller electrically disconnects both wiring connections, an overheat not being declared.

9. The overheat detection system according to claim 1, wherein the electrical status of each wiring connection is checked before shutting down the controller in order to determine an ending electrical status of each wiring connection as either operative or inoperative.

10. The overheat detection system according to claim 9, wherein the controller is configured to report to a database the ending electrical status of each wiring connection determined before shutting down the controller.

11. The overheat detection system according to claim 1, wherein the monitored system on which the wiring connections are running along is part of a pneumatic air distribution system.

12. The overheat detection system according to claim 11, wherein the pneumatic air distribution system is a system of an aircraft.

13. The overheat detection system according to claim 1, wherein each wiring connection comprises at least one sensing means connected in the same independent loop with the controller, the sensing means comprising a conductor core, a conductor outer sheath, and eutectic salts therebetween.

14. The overheat detection system according to claim 13, wherein an inoperative status of the wiring connection is determined by the controller if the conductor core of at least one of its sensing means comprises at least one electrical anomaly.

15. The overheat detection system according to claim 14, wherein the electrical anomaly is a discontinuity.

16. The overheat detection system according to claim 13, wherein an overheat on the monitored system produces a predetermined decrease on the sensing means impedance, thus creating an electrical path between the conductor core and the conductor outer sheath.

17. A pneumatic air distribution system comprising an overheat detection system according to claim 1.

18. A method for declaring an overheat, wherein the method comprises:
   providing an overheat detection system according to claim 1, and
   determining by the controller of the overheat detection system, the electrical status of each wiring connection at least between operative and inoperative, such that:
   in case the controller determines that only one wiring connection is in inoperative status, the controller electrically disconnects such inoperative wiring connection, or
   in case the controller determines that both wiring connections are in the same electrical status, both wiring connections remains connected,
      wherein the method further comprises declaring an overheat in one of the following cases:
   when both wiring connections are in operative status, and both wiring connections react upon such overheat;
   when only one wiring connection is in inoperative status, and the only one operative wiring connection reacts upon such overheat; or
   when both wiring connections are in inoperative status, and at least one of such inoperative wiring connections reacts upon such overheat.

* * * * *